Jan. 17, 1956
S. C. ROCKAFELLOW
2,731,594
PHASE SHIFTING DEVICE FOR THREE PHASE POWER
Filed Dec. 17, 1951
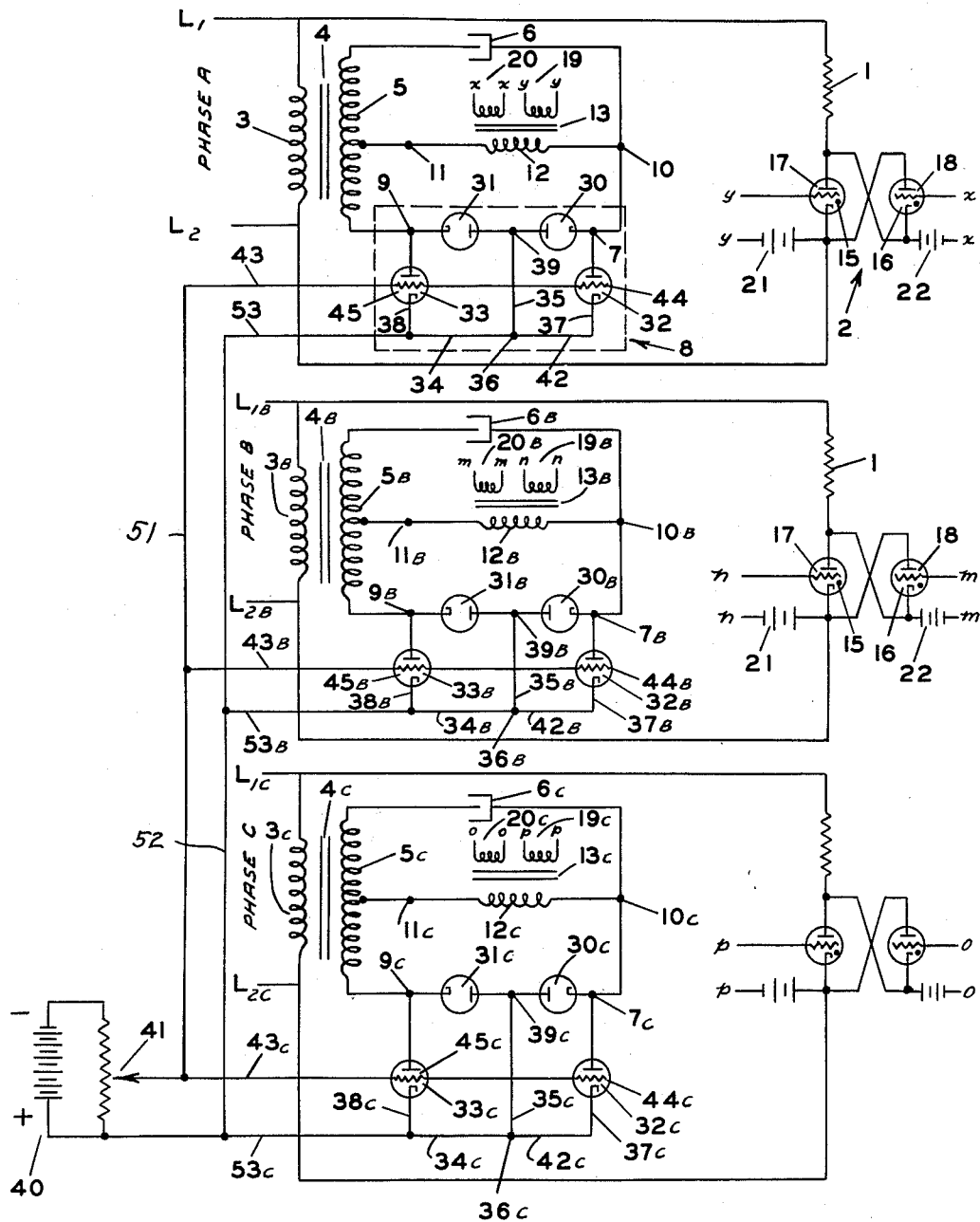
INVENTOR.
STUART C. ROCKAFELLOW
BY
ATTORNEY United States Patent Office 2,731,594
Patented Jan. 17, 1956

2,731,594

PHASE SHIFTING DEVICE FOR THREE PHASE POWER

Stuart C. Rockafellow, Farmington, Mich., assignor to Robotron Corporation, Detroit, Mich., a corporation of Michigan Application December 17, 1951, Serial No. 262,079

2 Claims. (Cl. 323—119)

This invention relates to phase shifting devices and particularly to a device for effecting a shifting of phase of all three phases of a three-phase circuit with the use of only a single control.

In previous phase shifting devices it has been well known to shift phase in a single phase circuit, but in all of these devices, insofar as I am aware, where it has been desired to effect such shift in each phase of a multi-phase circuit it has been necessary to control individually and manually each of the phase shifting control devices or it has been necessary to connect said devices together by some mechanical means for simultaneous operation. It has thus been obviously desirable for a long time to provide some means by which the phase shifting devices associated with each phase could be electrically connected so that only a single mechanical control is required.

In my application Serial No. 210,922, now abandoned, I have disclosed certain phase shifting means applicable to a single phase wherein vacuum-type electrical discharge devices are used to supply the variable resistance in a phase shifting circuit, I have now discovered that it is possible to use a plurality of these circuits, each associated with a single phase of a multiple phase system, and connect same through their several grids and cathodes of the vacuum tubes used therein, to provide the desired electrical connection for simultaneous control with a single manual or mechanical piece of control apparatus.

Accordingly, a major object of the invention is to provide means for shifting phase in each phase of a multiple phase system with but a single mechanical, or manual, control.

A further object of the invention is to provide means, as aforesaid, which are simple and easy to construct.

A further object of the invention is to provide means, as aforesaid, which may be ruggedly and sturdily constructed without complicating same.

Other objects and purposes of the equipment will be apparent to persons acquainted with the apparatus of this type upon reading the following disclosure and inspecting the accompanying drawing.

In the accompanying drawing there is shown a circuit diagram of one embodiment of my invention.

The individual circuit for each phase is fully disclosed in my application Serial No. 210,922 but for convenience in reference will be briefly repeated here. The description following is directed toward the part of the circuit connected to phase A of the source.

The conductors L1 and L2 are connected to any suitable alternating current source and energize the load 1 through the switch circuit 2. Said conductors are also connected to the primary winding 3 of a transformer 4. One side of the secondary winding 5 of said transformer is connected to a capacitor 6 and it in turn is connected to one terminal 7 of the variable resistor circuit 8. The other terminal 9 of said circuit 8 is connected to the other side of said secondary winding 5. A terminal 10, located between the capacitor 6 and the variable resistor circuit 8, constitutes one output terminal of the phase shift circuit, and the terminal 11, connected to a center tap on the secondary winding 5, constitutes the other output terminal of said phase shift circuit. In this instance the primary winding 12 of a transformer 13 is connected between said output treminals 10 and 11 as the load of said phase shift circuit.

In the switch circuit 2 there may be provided any desired apparatus. The particular apparatus here shown is illustrated and claimed in my co-pending application Serial No. 178,463 but will be described briefly here for purpose of convenient reference. The thyratrons 15 and 16 are connected in series in the load circuit in a conventional back-to-back, parallel arrangement. Each of their respective grids 17 and 18, respectively, is connected in series to the two secondary windings 19 and 20, respectively, of the transformer 13, thence through sources 21 and 22, respectively, of constant potential to the respective cathodes of said thyratrons. Thus, a constant D. C. bias for normally blocking conduction through said thyratrons is placed onto each of said grids, which bias is overcome alternately by potentials appearing on the secondary windings 19 and 20 sufficiently to effect the firing of the respective thyratrons.

The variable current control circuit 8 comprises the rectifiers 30 and 31 whose respective positive terminals or anodes are connected to each other and their negative terminals or cathodes are connected, respectively, to the terminals 7 and 9. In the specific embodiment here illustrated, conventional vacuum diodes are utilized. Alternatively, however, other conventional rectifiers may be used such as those of the dry-disk, or selenium, type. Vacuum tubes 32 and 33 are provided and have their respective anodes connected to the terminals 7 and 9. The cathodes of said vacuum tubes are connected to each other by the conductor 34 and a conductor 35 connects the point 36 intermediate said cathodes 37 and 38 to a point 39 on the conductor between said two rectifiers.

A small battery 40, or other source of constant potential, as a suitably charged condenser with a high resistance shunt, is connected at its respective terminals to each end of a potentiometer 41. The positive side of said source 40 of constant potential is also connected by the conductors 52 and 53 to said conductor 34 connecting the cathodes of said vacuum tubes. The slider of said potentiometer 41 is connected by the conductors 51 and 43 to both of the grids 44 and 45 of said vacuum tubes 33 and 32. Obviously, however, there is nothing essential in the connection of the slider itself to the grids of said vacuum tubes for, as indicated in Figure 2 of the drawings in my application Serial No. 210,922, the connections with respect to the fixed end of the potentiometer and the slider thereof may be reversed provided only that the negative side of said battery is connected to said grids.

Control over the potential imposed upon the control electrodes 44 and 45 of the vacuum tubes 32 and 33 will effect a shift in phase of the alternating current supplied at the output of the transformer 4 with respect to the input of the transformer 4 in the manner detailed by my application Serial No. 210,922.

The circuits connected to phases B and C are identical to the circuit connected to phase A, above described, and the parts thereof are indicated by corresponding numerals followed by the letters "B" and "C" respectively.

The common source 40 of D. C. potential is connected to each of the grids of the vacuum tubes 33b, 32b, 33c and 32c by the conductors 51 and 52 connecting to the conductors 43b and 53b and to the conductors 43c and 53c in the same manner as above described with respect to the conductors 43 and 53 of the phase A circuit.

It will be apparent from the foregoing that variation in the potential supplied between the conductors 51 and 52 will simultaneously and equally vary the conductivity of the several vacuum tubes. Inasmuch as varying the conductivity of the said vacuum tubes will vary the phase at the output terminals of each of said phase shifting circuits, it will be appreciated that the single potentiometer 41 may be utilized to vary simultaneously and equally the phase supplied to each of the respective loads and it will do without the necessity of other apparatus.

Accordingly, I have disclosed a preferred embodiment of apparatus capable of carrying out the purposes and objectives above set forth.

It will be recognized that the source 40 shown in the drawing may be replaced by a variety of other sources, such as the capacitor shown in Figure 2 of my application Serial No. 210,922. It will be recognized also that by the use of any of many conventional circuits, including that shown in said Figure 2 of Serial No. 210,922, the potential on the grids of the several vacuum tubes may be caused to gradually increase or gradually decrease and thereby effect gradual changes in the output of the phase shift circuit.

While I have described a specific embodiment for purposes of illustration, it will be recognized by those acquainted with apparatus of this sort that variations can be made from the specific apparatus here disclosed and the hereinafter appended claims are intended to include such variations excepting as said claims by their own terms expressly require otherwise.

I claim:

1. In apparatus for simultaneously shifting the phase of each phase circuit of a multi-phase system, the combination comprising: a phase shifting circuit in the circuit of each phase in said system, said phase shifting circuit including as the controllable element therein a vacuum type electric discharge device and said phase shifting circuit being so arranged that variation in the potential of the control electrode of said electric discharge device will shift the phase of that phase of said system into which each respective phase shifting circuit is connected; a source of multi-phase alternating current and means connecting each phase thereof respectively to the input terminals of each of said phase-shift circuits; a first conductor connecting together the control electrodes of each of said electric discharge devices; a second conductor connecting together the cathodes of each electric discharge device; means imposing a predetermined D. C. potential between said first and second conductors.

2. Apparatus described in claim 1 wherein said last-named means is adapted for imposing an adjustable D. C. potential.

References Cited in the file of this patent
UNITED STATES PATENTS

| | | |
|---|---|---|
| 2,008,855 | Drobish | July 23, 1935 |
| 2,228,843 | Palmer | Jan. 14, 1941 |
| 2,474,886 | Bovey | July 5, 1949 |